March 1, 1966 T. HORE 3,238,516

REDUCTION OF DELTA NOISE IN COINCIDENT-CURRENT MAGNETIC MATRIX STORAGE SYSTEMS

Filed July 14. 1961 4 Sheets-Sheet 1

INVENTOR
TERENCE HORE

BY Frank R. Trifari
AGENT

INVENTOR
TERENCE HORE
BY Frank R. Trifari
AGENT

March 1, 1966 T. HORE 3,238,516

REDUCTION OF DELTA NOISE IN COINCIDENT-CURRENT MAGNETIC MATRIX STORAGE SYSTEMS

Filed July 14, 1961 4 Sheets-Sheet 3

INVENTOR
TERENCE HORE
BY Frank R. Trifari
AGENT

INVENTOR
*TERENCE HORE*
BY Frank R. Jufais
AGENT

United States Patent Office 3,238,516
Patented Mar. 1, 1966

3,238,516
REDUCTION OF DELTA NOISE IN COINCIDENT-CURRENT MAGNETIC MATRIX STORAGE SYSTEMS

Terence Hore, Reigate, Surrey, England, assignor to North American Philips Company, Inc., New York, N.Y., a corporation of Delaware Filed July 14, 1961, Ser. No. 124,147
Claims priority, application Great Britain, Aug. 23, 1960, 29,177/60
4 Claims. (Cl. 340—174)

This invention relates to coincident-current magnetic matrix storage systems.

The invention relates more particularly to magnetic matrix storage systems of the type comprising a plurality of ferrite memory cores, each of which has a substantially square hysteresis loop, the cores being arranged in at least one plane in rows and columns; a plurality of address wires, one for each row and one for each column, which thread all the cores in the respective row or column; an inhibit wire for each plane which threads all the cores in the plane; an output wire which threads all the cores in such a manner as to minimize interference from non-selected cores; means for selecting, when reading followed by writing, a particular core by the application of a half-read-pulse followed by a half-write-pulse coincidentally to the two address wires corresponding to the row and column of the particular core; and means for applying a half-inhibit-pulse to at least one inhibit wire in coincidence with and in opposition to the half-read or the half-write pulses when it is required to inhibit reading or writing in a selected core.

Such a store is capable of storing binary information in the form of "0's" and "1's" and, when reading out from any given core of such a store, an output pulse can be made to appear on the output wire when a "1" is read and substantially no output when a "0" is read.

There are, however, a number of factors which can cause unwanted output or noise. These will be further explained with reference to FIGURES 1 and 2 of the accompanying drawings, in which.

Figure 1:
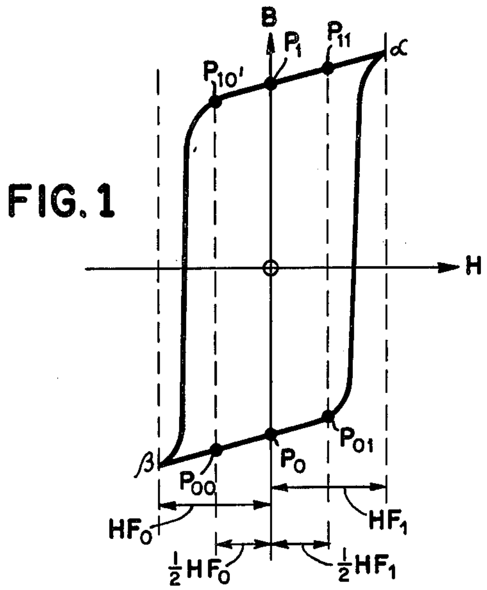
FIG. 1 shows a typical hysteresis loop for a core of the type described.

In FIGURE 1 $P_1$ represents the position on the hysteresis loop of a core recording a "1" and $P_0$ that of a core recording a "0." $HF_1$ represents the magnitude and direction of a write pulse which will cause a core to go from the point $P_0$ or $P_1$ to the point $\alpha$ and thence to the point $P_1$. A half-write pulse $\frac{1}{2}HF_1$ will act as a disturbance to cause the core to be displaced or "disturbed" to the points P11 or Po1 and thence back to its original position. $HF_0$ represents the magnitude and direction of a read pulse which will cause a core to go to the point $\beta$ and thence to $P_0$. Similarly $\frac{1}{2}HF_0$ represents a half-read pulse which will disturb a core to the point $P_{10}$ or $P_{00}$ and thence back to its original position.

Every time that a half-pulse $\frac{1}{2}HF_0$ or $\frac{1}{2}HF_1$ is applied to a core the core will be disturbed and a small output pulse will occur on the output wire. The output wire is normally threaded through the cores in such a manner that these small outputs from cores on the same address wire substantially cancel each other. Such a winding is designated by reference numeral 3 in FIGURE 2 of the accompanying drawings and generally forms a diagonal pattern.

The magnitude of the disturb output from a core depends on its immediate past history, i.e., how it was disturbed in the previous cycle, and will be less if the disturb is in the same direction as the previous disturb. A core which has just been switched to a "one" state, therefore, will give a large disturb when a half-read pulse $\frac{1}{2}HF_0$ is applied to it in the following cycle. A known solution to this problem is to apply at the end of a cycle a so called "post-write disturb" pulse in the read direction $\frac{1}{2}HF_0$ to all the cores of a plane by means of the inhibit wire designated reference numeral 4 in FIGURE 2. This pulse is also known as a "half-inhibit" pulse. Thus in the following cycle all the cores will have the same immediate past history and the disturb noise from applying a half-read pulse $\frac{1}{2}HF_0$ will be reduced.

Figure 2:
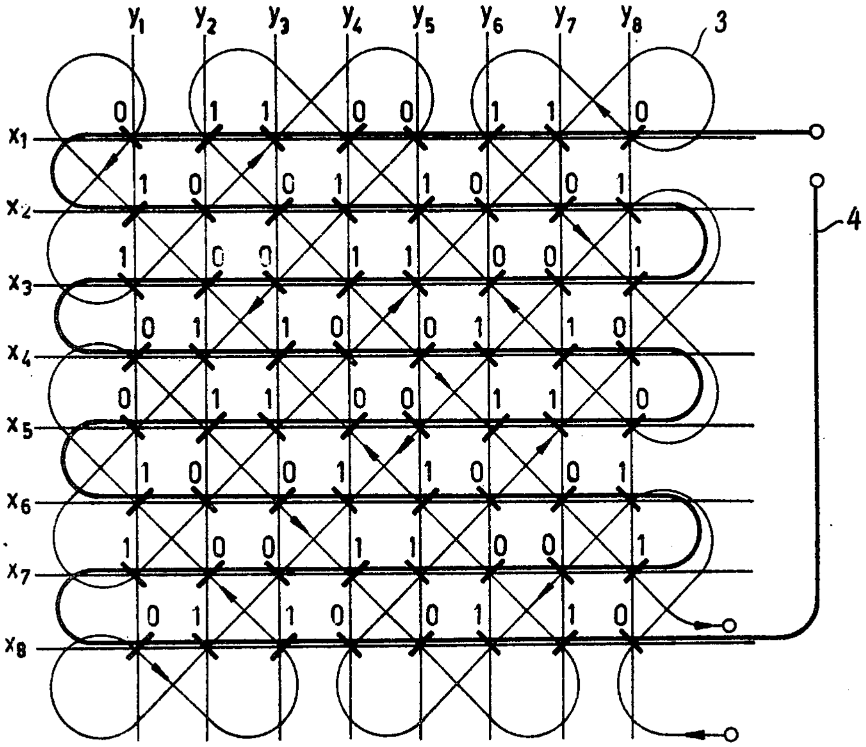
FIG. 2 shows an 8 x 8 memory matrix store containing the so-called "worst" pattern of information.

Referring to FIGURE 1 it can be seen, however, that the portion $P_1$–$P_{10}$, which corresponds to half-reading a "1" core, is similar to but not quite the same as the portion $P_0$–$P_{00}$, which corresponds to half-reading a "0" core. Thus in conditions where the output from a half-read "0" core has to cancel the output from a half-read "1" core a small output pulse will occur. These pulses are known as "delta" noise. This noise will be a maximum when the pattern of information is such that the output from every half-read "0" core is cancelled with an output from a half-read "1" core, this situation being clearly the "worst" pattern. An example of this worst pattern of information is shown in FIGURE 2, where if the difference between a half-read "0" and a half-read "1" core is $\delta V$, the delta noise output from half-reading one of each of the address wires $x_1$ and $y_1$, will be $8\delta V$. If a half-pulse is applied to the inhibit wire all cores in the plane will receive a half pulse and the delta noise output will be $32\ \delta V$.

When using a plane with a larger number of, for example, 64 x 64, cores the delta noise, in worst pattern conditions, from the post-write disturb pulse will therefore tend to swamp the following read pulses unless sufficient time is left for the delta noise pulse to decay. Also when writing a "0" into a core, the delta noise from the half-inhibit pulse (inhibiting the writing of a "one") will tend to swamp the post-write pulse itself. In addition, the length of the $x$ wires and $y$ wires (together called "address wires") results in a large capacity between each of the address wires and the inhibit wire, which will tend to absorb current pulses.

It is an object of the present invention to mitigate or obviate these disadvantages and to provide a storage system capable of operating satisfactorily with a large number of, for example 64, cores in each row and column.

The store according to the present invention comprises a plurality of magnetic cores arranged in at least one plane according to rows and columns; a plurality of address wires, one for each row and one for each column threaded through all the cores in the respective row or column; an inhibit wire for each plane threaded through all the cores in the plane; an output wire threaded through all the cores in such a manner as to minimize interference from non-selected cores; means for selecting, when reading followed by writing, a particular core by the application of a half-read pulse followed by a half-write pulse coincidentally to the two address wires corresponding to the row and column of the particular core; means for applying a half-inhibit pulse to at least one inhibit wire in coincidence with and in opposition to the half-read or the half-write pulses when it is required to inhibit reading or writing in a selected core; and means for applying a half-read pulse to each of the said two address wires so as to be mutually non-coincident in time and prior to the half-read pulses.

Figure 3:
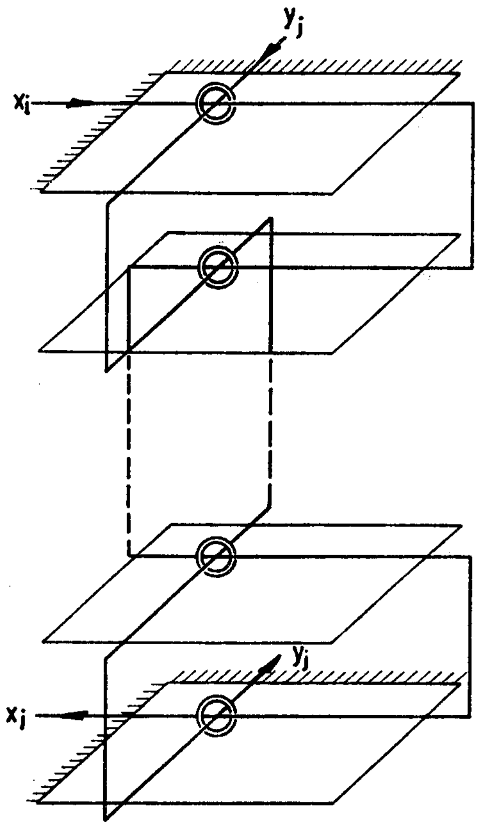
Figure 4:
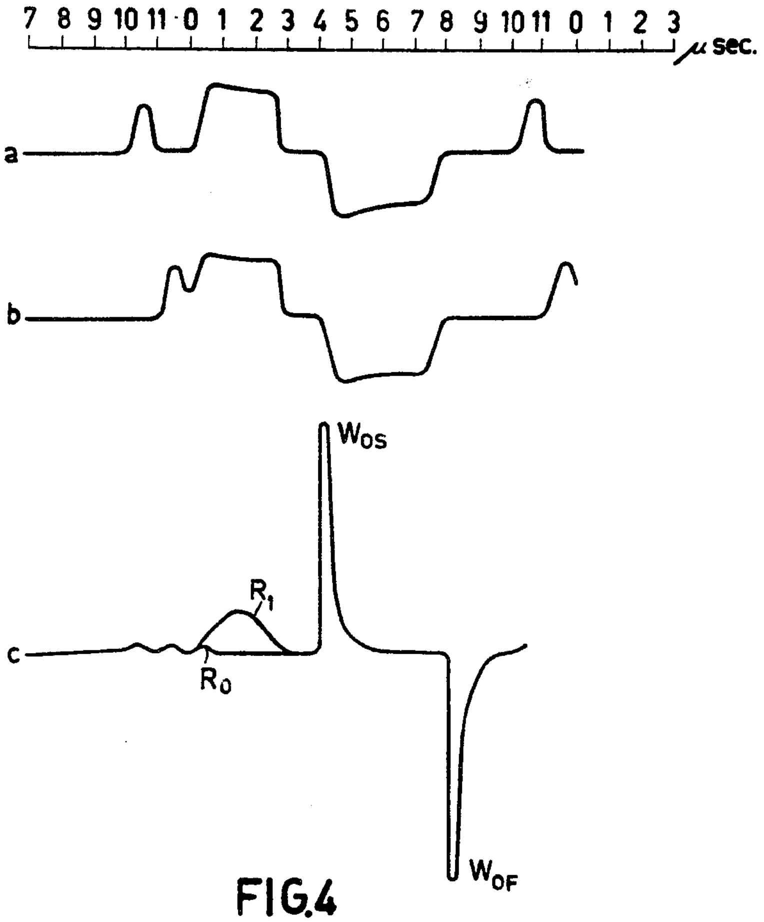
Figure 5:
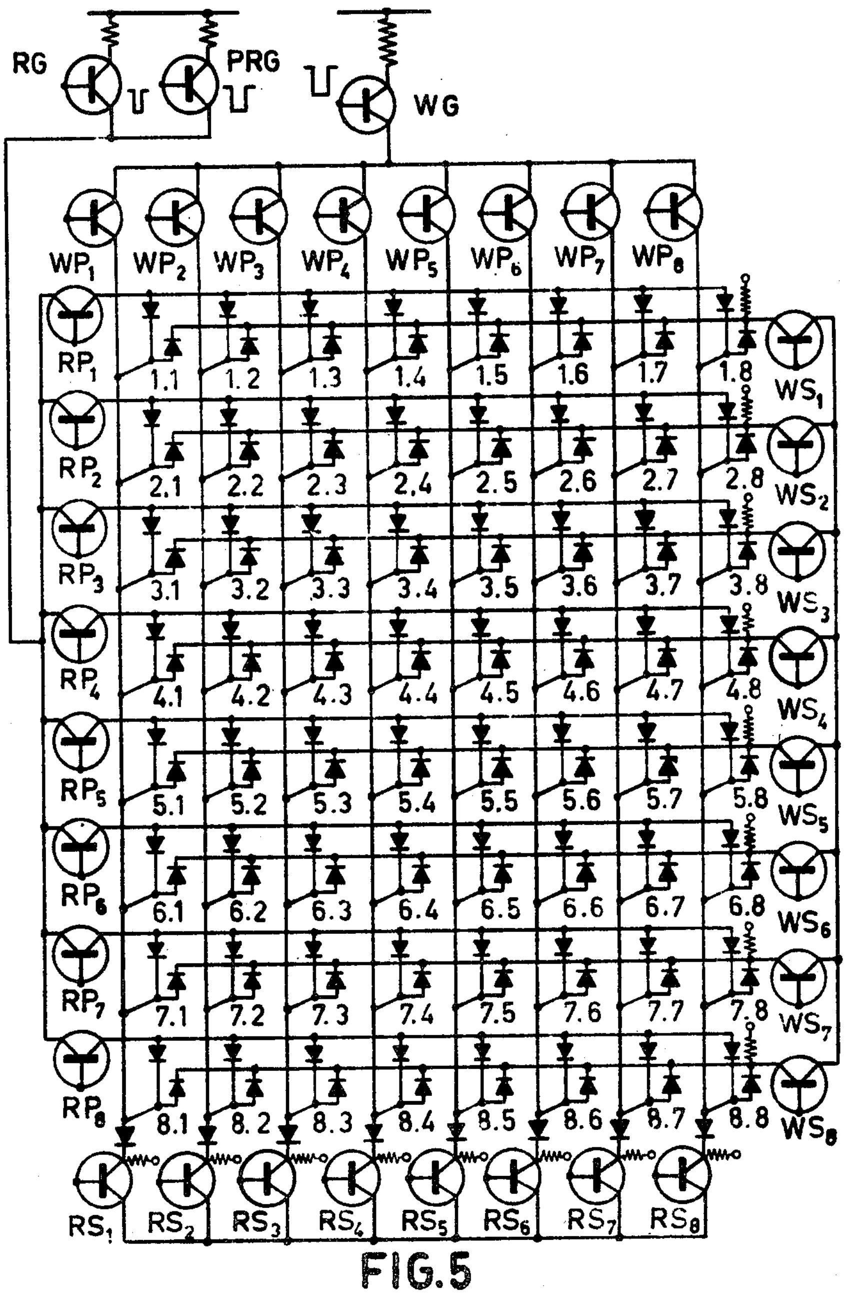

An embodiment of the invention will now be described by way of example with reference to FIGURES 3–5 of the accompanying drawings in which:

FIGURE 3 shows a number of planes of cores of the type herein set forth arranged in a stack;

FIGURE 4 shows a number of waveforms occurring during the operation of the storage;

FIGURE 5 shows a selection system for selecting an address wire.

FIGURE 3 shows a number of planes of cores in which each plane of cores is of the type set forth above and arranged substantially as shown in FIGURE 2 except that there are 64 x 64 cores in each plane. There are 64 $x$ address wires each of which is threaded through all the cores of the relevant row in each plane, and 64 $y$ address wires each of which is threaded through all the cores of the relevant column in each plane. Of these wires only one for each row and for a column is shown in FIGURE 3. Each plane, of which there are 20, has its own inhibit wire and an output wire is threaded through all the cores of every plane. When a selected core goes through the cycle of being read-out followed by being written-in, the pulses shown in FIGURES 4 ($a$) and ($b$) are applied to the relevant $x$ address wire and $y$ address wire. For the reasons previously given and in accordance with the invention a preread disturb pulse is applied to each address wire. In the FIGURES 4*a* and 4*b* this is the short pulse before the longer half-read pulse. It is necessary, of course, that the pre-read disturb pulse applied to the relevant $x$ address wire and the relevant $y$ address wire should be mutually non-coincident in time since otherwise they would switch the core, which is not wanted.

The voltage induced in the output wire depends on whether a 0 or 1 has been stored in the core. The waveform $R_0$ corresponds to a 0, the waveform $R_1$ to a 1 (FIG. 4*c*). The waveform may be strobed to enable the voltage during only the required time (referred to as the "read-time") to be ascertained, but this is not always necessary. Current will be applied to the inhibit wires of all planes except one in coincidence with the half-read pulses in the $x$ and $y$ address wires in order to inhibit reading of a core in a non-desired plane. These pulses also prevent information from being written back into the cores that have not been read-out. When the writing of a "one" is inhibited by the application of a half-inhibit pulse to the inhibit wire a large amount of delta noise is caused in the output wire, the noise having a peak $W_{OS}$ at the start of the write pulse and a peak $W_{OF}$ at the end of the pulse as shown in FIGURE 4*c*. As can be seen the peak $W_{OF}$ would tend to swamp a post-write disturb pulse if it were to be applied immediately after the half pulse for writing, i.e., 8 $\mu$sec. after start read time.

The relevant $x$ address wire may be selected by means of a coordinate selection system as shown in FIGURE 5 and the relevant $y$ address wire may be selected by a similar coordinate selection system.

The coordinate selection system shown in FIGURE 5 selects any one of the 64 address wires ($i, j$)($i, j$=1, 2 . . . 8) (shown as thick lines) by means of primary and secondary selectors. Any one of the 64 addresses is selected by selecting a particular one of 8 primary selectors and a particular one of 8 secondary selectors. The arrangement in FIGURE 5 comprises 8 primary selectors $RP_i$ for reading, 8 secondary selectors $RS_j$ for reading, 8 primary selectors $WP_i$ for writing and 8 secondary selectors $WS_j$ for writing. Each of these selectors is constituted by a transistor which is biased on or off by applying a voltage to its base. Thus when it is required to select a particular address wire, for example, the address wire (2.4) for reading, the primary read selector $RP_2$ and the secondary read selector $RS_4$ are both biased on, so forming a path for a read current, generated by a read current generator RGen., through the relevant address wire 2.4. In a similar manner a pulse may be applied to any address wire for writing by means of the write current generator WGen.

A pre-read disturb generator PRGen. is connected in parallel with the read current generator RGen. so that a pre-read disturb pulse may be applied to an address wire selected in the manner described.

Many modifications of the invention will be apparent to those skilled in the art without departing from the inventive concept, the scope of which is set forth in the appended claims.

What is claimed is:

1. A coincident current magnetic matrix system comprising a plurality of ferrite memory cores, each of which has a substantially square hysteresis loop, the cores being arranged in one plane in rows and columns; a plurality of address wires, one for each row and one for each column threading all the cores in the respective row or column; an inhibit wire for the plane threading all the cores in the plane; an output wire threading all the cores in such a manner as to minimize interference from half selected cores; means for selecting a particular core, for reading followed by writing, by the application of a half-read pulse coincidentally to the two address wires corresponding to the row and column of the particular core followed by the application of a half-write pulse coincidentally to the two address wires corresponding to the row and column of the particular core; means for applying a half-inhibit pulse to the inhibit wire in coincidence with and in opposition to the half-read or the half-write pulses when it is required to inhibit reading or writing-in a selected core; and means for applying an additional half-read pulse to each of the said two address wires prior to the application of the half-read pulse, said additional half-read pulses being mutually non-coincident in time.

2. A coincident current magnetic matrix system as claimed in claim 1 in which the plane has sixty-four rows and sixty-four columns.

3. A coincident current magnetic matrix system comprising a plurality of ferrite memory cores, each of which has a substantially square hysteresis loop, the cores being arranged in a plurality of planes in rows and columns within each plane; a plurality of address wires, one for each row and one for each column, threading all the cores in the respective row or column; an inhibit wire for each plane threading all the cores in the plane; an output wire threading al the cores in such a manner as to minimize interference from half selected cores; means for selecting a particular core, for reading followed by writing, by the application of a half-read pulse coincidentally to the two address wires corresponding to the row and column of the particular core followed by the application of a half-write pulse coincidentally to the two address wires corresponding to the row and column of the particular core; means for applying a half-inhibit pulse to at least one inhibit wire in coincidence with and in opposition to the half-read or the half-write pulses when it is required to inhibit reading or writing in a selected core; and means for applying an aditional half-read pulse to each of the said two address wires prior to the application of the half-read pulse, said additional half-read pulses being mutually non-coincident in time.

4. A coincident current magnetic matrix system as claimed in claim 3 in which each plane has sixty-four rows and sixty-four columns.

References Cited by the Examiner

UNITED STATES PATENTS

| | | | |
|---|---|---|---|
| 2,889,540 | 6/1959 | Bauer | 340—174 |
| 2,929,050 | 3/1960 | Russell | 340—174 |
| 2,970,296 | 1/1961 | Horton | 340—174 |
| 2,981,931 | 4/1961 | Tate. | |
| 3,058,096 | 10/1962 | Humphrey | 340—174 X |

IRVING L. SRAGOW, *Primary Examiner.*